(12) United States Patent
Gotou et al.

(10) Patent No.: US 9,688,826 B2
(45) Date of Patent: Jun. 27, 2017

(54) BIAXIALLY STRETCHED POLYESTER FILM AND METHOD FOR PRODUCING SAME

(71) Applicant: TOYOBO CO., LTD., Osaka-shi, Osaka (JP)

(72) Inventors: Takamichi Gotou, Inuyama (JP); Toshiyuki Shimizu, Otsu (JP); Tadashi Nakaya, Inuyama (JP); Yoshitomo Ikehata, Inuyama (JP)

(73) Assignee: Toyobo Co., Ltd., Osaka (JP)

( * ) Notice: Subject to any disclaimer, the term of this patent is extended or adjusted under 35 U.S.C. 154(b) by 179 days.

(21) Appl. No.: 14/442,769

(22) PCT Filed: Nov. 8, 2013

(86) PCT No.: PCT/JP2013/080221
§ 371 (c)(1),
(2) Date: May 14, 2015

(87) PCT Pub. No.: WO2014/077197
PCT Pub. Date: May 22, 2014

(65) Prior Publication Data
US 2015/0299406 A1 Oct. 22, 2015

(30) Foreign Application Priority Data

Nov. 16, 2012 (JP) ................. 2012-252150

(51) Int. Cl.
| | | |
|---|---|---|
| C08J 5/18 | (2006.01) |
| B29C 55/02 | (2006.01) |
| B29C 55/14 | (2006.01) |
| B29D 7/01 | (2006.01) |
| B29C 55/00 | (2006.01) |
| B29K 67/00 | (2006.01) |
| B29K 33/04 | (2006.01) |

(52) U.S. Cl.
CPC ............... C08J 5/18 (2013.01); B29C 55/005 (2013.01); B29C 55/023 (2013.01); B29C 55/14 (2013.01); B29C 55/143 (2013.01); B29D 7/01 (2013.01); *B29K 2033/04* (2013.01); *B29K 2067/006* (2013.01); *B29K 2995/0077* (2013.01); *B29K 2995/0081* (2013.01); *B29K 2995/0082* (2013.01); *B29K 2995/0089* (2013.01); *C08J 2367/03* (2013.01); *C08J 2467/00* (2013.01)

(58) Field of Classification Search
None
See application file for complete search history.

(56) References Cited

U.S. PATENT DOCUMENTS

| | | | | |
|---|---|---|---|---|
| 4,341,827 | A | * | 7/1982 | Austen ................ B29C 47/0004 138/137 |
| 2005/0118442 | A1 | | 6/2005 | Itoh et al. |
| 2007/0026223 | A1 | | 2/2007 | Osada et al. |
| 2009/0274955 | A1 | * | 11/2009 | Kikuchi ............. B01D 67/0027 429/144 |
| 2011/0177289 | A1 | | 7/2011 | Takegami |
| 2013/0260161 | A1 | | 10/2013 | Nagae et al. |
| 2013/0302568 | A1 | | 11/2013 | Takegami |

FOREIGN PATENT DOCUMENTS

| | | |
|---|---|---|
| JP | S51-146572 A | 12/1976 |
| JP | H02-016029 A | 1/1990 |
| JP | H05-200860 A | 8/1993 |
| JP | 2003-266519 A | 9/2003 |
| JP | 2003-268131 A | 9/2003 |
| JP | 2007-196635 A | 8/2007 |
| JP | 2010-106265 A | 5/2010 |
| JP | 2012-077292 A | 4/2012 |
| JP | 2012-121241 A | 6/2012 |
| JP | 2012-146636 A | 8/2012 |
| JP | 2013-256110 A | 12/2013 |
| WO | 2004/108408 A1 | 12/2004 |

OTHER PUBLICATIONS

Japanese Patent Office, International Search Report in International Patent Application No. PCT/JP2013/080221 (Feb. 10, 2014).

* cited by examiner

*Primary Examiner* — Christopher M Rodd
(74) *Attorney, Agent, or Firm* — Leydig, Voit & Mayer, Ltd.

(57) ABSTRACT

It is provided that a biaxially stretched polyester film suitable for uses for which nylon films and other flexible films have conventionally been used and a method for producing the film. A biaxially stretched polyester film made of a polyester resin composition (A) containing not less than 60 mass % of polybutylene terephthalate and having yield stress in a MD of not more than 70 MPa, yield stress in a TD of not more than 70 MPa, rupture strength in the MD of not less than 160 MPa, rupture strength in the TD of not less than 160 MPa, and rupture elongation in the MD and TD of not less than 100%.

14 Claims, No Drawings

… (US 9,688,826 B2)

BIAXIALLY STRETCHED POLYESTER FILM AND METHOD FOR PRODUCING SAME

CROSS-REFERENCE TO RELATED APPLICATIONS

This patent application is the U.S. national phase of International Patent Application No. PCT/JP2013/080221, filed Nov. 8, 2013, which claims the benefit of Japanese Patent Application No. 2012-252150, filed on Nov. 16, 2012, which are incorporated by reference in their entireties herein.

TECHNICAL FIELD

The present invention relates to a polyester film and its production method. More particularly, the invention relates to a polyester film suitable for uses for which nylon films and other flexible films have conventionally been used, and excellent in impact resistance, flexibility, and balance of mechanical strength.

BACKGROUND ART

Being excellent in the gas barrier property and chemical resistance in addition to mechanical characteristic and impact resistance, polybutylene terephthalate (hereinafter, referred to as PBT) has conventionally used as an engineering plastic and particularly as a useful material owing to good productivity attributed to the crystallization speed. However, PBT has high crystallization speed and its biaxial stretch has been considered to be difficult. That is because crystallization occurs due to stretch in stretching process and thus stretching becomes difficult.

There is a technique known for producing a biaxially stretched PBT film by stretching in the TD direction at a stretch ratio of 3.5 times or lower and successively in the MD direction at a deformation speed of 100000%/min to produce an evenly stretched film with no thickness unevenness (see, for example, Patent Document 1). However, as being indicated from the results of Examples, such a conventional technique has a problem that a film produced by the technique has low elongation and is inferior in transparency and dimensional stability because of high deformation speed only in the MD direction and therefore fails to be in good balance between the MD direction and the TD direction (see, for example, Patent Document 1).

Regarding an un-stretched PBT film, there is a technique known for keeping piercing displacement within a specified range to provide excellent processing suitability for uses to carry out drawing formation, such as an exterior material for lithium ion batteries (see, for example, Patent Document 2).

However, such a conventional technique has a problem that stretch of PBT is weak since PBT is not stretched and the intrinsic characteristics of PBT are not sufficiently extracted in terms of mechanical characteristic and impact resistance.

Accordingly, in order to advantageously utilize the intrinsic characteristics of PBT, investigations for the purpose of enhancing plane orientation by biaxial stretch and improving mechanical characteristic and impact resistance have been made for past 40 years or more. Some of past investigations on a PBT film will be examined.

For example, there is a technique known for producing a film with slight anisotropy and excellent in mechanical properties and dimensional stability by producing a PBT film with rupture strength of specified values or higher in 4 directions by employing a tubular and simultaneous biaxial stretch method (see, for example, Patent Document 3).

However, such a conventional technique has a problem that the thickness precision is inferior attributed to the production method and plane orientation coefficient is not high and therefore, piercing strength is low.

Further, there is a technique known for providing high rigidity and excellent dimensional stability and formability at a high temperature by alternately and solely layering two kind resins such as polyethylene terephthalate (PET) and polyethylene naphthalate (PEN) besides PBT in a large number of layers (see, for example, Patent Document 4).

However, such a technique has a problem that layers of resins such as PET and PEN other than PBT are layered and Tg of PET or PEN is higher than Tg of PBT, and subsequently, elongation of PBT is carried out at high temperature and therefore the elongation of PBT is at such a high temperature as to fail to extract the intrinsic characteristics of the PBT film and additionally a problem that resin composition of the film contains two kind resins and therefore it is difficult to reuse trimming dust generated at the time of film formation by adding again to starting materials.

As described above, conventional biaxially stretched polybutylene terephthalate films have no capability sufficient for uses as wrapping materials and exterior materials for lithium batteries.

PRIOR ART DOCUMENTS

Patent Documents

Patent Document 1: JP-A-syo-51-146572
Patent Document 2: JP-A-2012-77292
Patent Document 3: JP-A-2012-146636
Patent Document 4: WO2004/108406

SUMMARY OF THE INVENTION

Problems to be Solved by the Invention

The present invention is made to solve the above-mentioned problems of conventional techniques in the background. That is, the aim of the invention is to provide a biaxially stretched polyester film suitable for uses for which nylon films and other flexible films have conventionally been used and to provide a method for producing the film.

Solutions to the Problems

The inventors of the present invention have made investigations to achieve the aim and consequently completed the present invention.

That is, the present invention is a biaxially stretched polyester film made of a polyester resin composition (A) containing not less than 60 mass % of polybutylene terephthalate and having yield stress in a MD of not more than 70 MPa, yield stress in a TD of not more than 70 MPa, rupture strength in the MD of not less than 160 MPa, rupture strength in the TD of not less than 160 MPa, and rupture elongation in the MD and TD of not less than 100%.

In this case, it is preferable that the polyester resin (A) contains a polyester resin (B) other than polybutylene terephthalate.

It is preferable that a method for producing the biaxially stretched polyester film which is obtained by biaxially stretching an un-stretched polyester sheet with a thickness of 15 to 2500 µm which is obtained by multi-layering a same composition in not less than 60 layers and casting the layered body.

In this case, it is preferable that bringing an un-stretched polyester sheet into contact with a chill roll at not more than 20° C. to cool the sheet and biaxially stretching the sheet.

In this case, it is preferable that biaxially stretching an un-stretched polyester sheet containing spherulites with diameter of not more than 500 nm in the un-stretched polyester sheet.

In this case, it is preferable that a ratio of the rupture strength in the MD and the rupture strength in the TD is not more than 1.5 and a ratio of the rupture elongation in the MD and the rupture elongation in the TD is not more than 1.5.

In this case, it is preferable that sequentially biaxially stretching the un-stretched polyester sheet.

Effect of the Invention

The present invention makes it possible to obtain a biaxially stretched polyester film suitable for uses for which nylon films and other flexible films have conventionally been used.

MODE FOR CARRYING OUT THE INVENTION

Hereinafter, the present invention will be described in detail.

A polyester resin composition (A) to be used in the present invention contains PBT as a main constituent component and the content of PBT is preferably not less than 60 mass %, more preferably not less than 70 mass %, furthermore preferably not less than 75 mass %, and even more preferably not less than 80 mass %. If the content is less than 60 mass %, impact resistance and pinhole resistance are lowered and become insufficient as film characteristics.

PBT to be used as a main constituent component contains, as a dicarboxylic acid component, terephthalic acid in an amount of preferably not less than 90 mol %, more preferably not less than 95 mol %, furthermore preferably not less than 98 mol %, and even more preferably 100 mol %. It contains, as a glycol component, 1,4-butanediol in an amount of preferably not less than 90 mol %, more preferably not less than 95 mol %, and furthermore preferably not less than 97 mol %; and it is most preferable to contain nothing other than byproducts produced by ether linkage of 1,4-butanediol at the time of polymerization.

A polyester resin (A) to be used in the present invention may contain a polyester resin (B) other than PBT for the purpose of adjusting the film formability at the time of biaxial stretch and the mechanical characteristic of a film to be obtained.

Examples of the polyester resin (B) other than PBT may include polyester resins such as polyethylene terephthalate (PET), polyethylene naphthalate (PEN), polybutylene naphthalate (PBN), polypropylene terephthalate (PPT) etc., as well as PBT resins copolymerized with dicarboxylic acids such as isophthalic acid, orthophthalic acid, naphthalenedicarboxylic acid, biphenyldicarboxylic acid, cyclohexanedicarboxylic acid, adipic acid, azelaic acid, sebacic acid, etc., and PBT resins copolymerized with diol components such as ethylene glycol, 1,3-propylene glycol, 1,2-propylene glycol, neopentyl glycol, 1,5-pentanediol, 1,6-hexanediol, diethylene glycol, cyclohexanediol, polyethylene glycol, polytetramethylene glycol, polycarbonate diol, etc.

The addition amount of polyester resins other than these PBTs is preferably not more than 40 mass %. If the addition amount of a polyester resin other than PBT exceeds 40 mass %, the mechanical characteristic as PBT is deteriorated and impact resistance, pinhole resistance, and drawing formability may become insufficient.

Further as an additive, a polyester type and a polyamide type elastomers copolymerized with at least one of a soft polyether component, a polycarbonate component, and a polyester component may be added to improve the pinhole resistance at the time of flexure.

It is preferable that the lower limit of the addition amount of these additives is 0 mass % and the upper limit is 20 mass %. If the addition amount exceeds 20 mass %, the effect may be saturated and additionally, transparency may be lowered in some cases.

The lower limit of the resin melting temperature is preferably 200° C. and if it is less than 200° C., discharge may become unstable. The upper limit of the resin melting temperature is preferably 320° C. and if it exceeds 320° C., the resin may be deteriorated in some cases.

The above-mentioned polyester resin may contain conventionally known additives, for example, a lubricant, a stabilizer, a coloring agent, an antioxidant, an anti-static agent, an ultraviolet absorber, etc., as necessary.

As a lubricant type, inorganic lubricants such as silica, calcium carbonate, alumina, etc. and also organic lubricants are preferable; silica and calcium carbonate are more preferable; and calcium carbonate is particularly preferable. These lubricants provide transparency and slippage.

The lower limit of the lubricant concentration is preferably 100 ppm and if it is less than 100 ppm, slippage may be lowered in some cases. The upper limit of the lubricant concentration is preferably 20000 ppm and if it exceeds 20000 ppm, transparency may be lowered in some cases.

The first key point of one example of desirable methods for obtaining a film according to the present invention is such that starting materials of the same composition are multi-layered and cast at the time of casting.

Since PBT has high crystallization speed, crystallization proceeds even at the time of casting. At that time, in the case of casting in a monolayer without layering multi-layers, since there is no barrier which can suppress crystal growth, the crystals are grown to be spherulites with large size. As a result, the obtained un-stretched sheet has high yield stress and is easy to be ruptured at the time of biaxial stretch and also the obtained biaxially stretched film has high yield stress and becomes insufficient in formability.

Meanwhile, the inventors of the present invention have found that not only the stretching stress of an un-stretched sheet can be lowered and stable biaxial stretch is made possible, but also the obtained biaxially stretched film has low yield stress and accordingly it is made possible to obtain a film flexible and having high rupture strength by layering the same resin in multi-layers.

The reason is supposed so that there is the interface of layers even in the case of the same resin is layered and crystallization is accelerated owing to the interface and on the other hand, crystal growth beyond layers is suppressed, resulting in the small size of spherulites.

A practical method for making small size of spherulites by multi-layering may be carried out using a common multi-layering apparatus (e.g., a multi-layer feed block, a static mixer, a multi-layer multi-manifold, etc.) and may be, for example, a method comprising steps of sending a thermoplastic resin from different channels using two or more extruders and layering the thermoplastic resin in multi-layers using a field block, a static mixer, a multi-manifold die, etc. Additionally, in the case of forming multi-layers of the same composition just like the case of the present invention, it is also possible to accomplish the aim of the invention by introducing the above-mentioned multi-layering apparatuses in a melt line from an extruder to a die while using only a single extruder.

The second key point of one example of desirable methods for obtaining a film according to the present invention is such that the crystallization degree of an un-stretched sheet is kept low at the time of casting. The practical method thereof is a casting to a chill roll at a low temperature. Further, it is also possible to increase the cooling efficiency by installing a touch roll for cooling the face which is not to be brought into contact with a chill roll.

The lower limit of the die temperature is preferably 200° C. and if it is less than the temperature, injection may become unstable and therefore thickness may become uneven in some cases. The upper limit of the die temperature is preferably 350° C. and if it exceeds the temperature, thickness may become uneven and additionally resin deterioration may be caused and appearance may become inferior because of staining of die lips in some cases.

The lower limit of the chill roll temperature is preferably −10° C. and if it is less than the temperature, the crystallization suppression effect may be saturated in some cases. The upper limit of the chill roll temperature is preferably 20° C. and if it exceeds the temperature, the crystallization degree may become so high as to make stretching difficult in some cases. In the case where the chill roll temperature is controlled to be within the above-mentioned range, it is preferable to lower the humidity in the ambient environment close to the chill roll for preventing dew formation.

In the casting, the temperature of the chill roll surface is increased since the resin with high temperature is brought into contact with the surface. Usually, the chill roll is cooled by setting a pipe in the inside and flowing cooling water therein, however, it is necessary to suppress the temperature difference in the width direction of the chill roll surface by reliably keeping a sufficient amount of cooling water, properly adjusting the arrangement of the pipe, carrying out maintenance work for preventing deposition of sludge in the pipe, etc. It has to be careful particularly in the case where cooling is carried out at a low temperature without employing a multi-layering method.

In this case, the thickness of an un-stretched sheet is preferable to be in a range from 15 to 2500 μm.

The above-mentioned casing in the multi-layer structure, the casting may be carried out in at least 60 layers, preferably not less than 250 layers, and more preferably not less than 1000 layers. If the number of the layers is low, the spherulite size of the un-stretched sheet becomes large and not only the effect of improving stretchability becomes slight, but also the effect of lowering the yield stress of the obtained biaxially stretched film is lost.

In this case, it is preferable that the spherulite diameter in the un-stretched polyester sheet is 500 nm or smaller.

The lower limit of the specific gravity of the center part of the above-mentioned un-stretched polyester sheet is 1.25 g/cm$^3$ and if it is less than the above-mentioned value, the effect of improving the stretchability may be saturated in some cases. The upper limit of the specific gravity of the center part is preferably 1.3 g/cm$^3$ and if it exceeds the above-mentioned value, the crystallization degree may be too high to make stretching difficult.

Next, a stretching method will be described. A stretching method may be simultaneous biaxial stretching and sequential biaxial stretching and for improving the piercing strength, it is needed to increase the plane orientation coefficient and in this term, sequential biaxial stretching is preferable.

The lower limit of the stretching temperature in the vertical stretching direction (hereinafter, referred to as MD) is preferably 40° C. and more preferably 45° C. If it is less than 40° C., rupture may be caused easily in some cases. The upper limit of the stretching temperature in the MD is preferably 100° C. and more preferably 95° C. If it exceeds 100° C., no stretch is applied so that mechanical characteristics may be deteriorated in some cases.

The lower limit of the stretch ratio in the MD is preferably 2.5 times and if it is less than the above-mentioned value, no stretch is applied so that mechanical characteristics and thickness unevenness may be worsened in some cases. The upper limit of the stretch ratio in the MD is preferably 5 times and if it is exceeds the above-mentioned ratio, the effect of improving mechanical strength and the thickness evenness may be saturated in some cases.

The lower limit of the stretching temperature in the transverse stretching direction (hereinafter, referred to as TD) is preferably 40° C. and if it is less than the above-mentioned value, rupture tends to be caused easily in some cases. The upper limit of the stretching temperature in the TD is preferably 100° C. and if it is exceeds the above-mentioned temperature, no stretch is applied so that mechanical characteristics may be worsened in some cases.

The lower limit of the stretch ratio in the TD is preferably 2.5 times and if it is less than the above-mentioned value, no stretch is applied so that mechanical characteristics and thickness unevenness may be worsened in some cases. The upper limit of the stretch ratio in the TD is preferably 5 times and if it is exceeds the above-mentioned ratio, the effect of improving mechanical strength and the thickness evenness may be saturated in some cases.

The lower limit of the heat fixation temperature in the TD is preferably 150° C. and if it is less than the above-mentioned temperature, thermal shrinkage becomes significant, and difference and shrinkage may be caused at the time of processing in some cases. The upper limit of the heat fixation temperature in the TD is preferably 250° C. and if it exceeds the above-mentioned temperature, the film may be melted in some cases and additionally, even if not melted, the film may be fragile otherwise.

The lower limit of the relaxation ratio in the TD is preferably 0.5% and if it is less than the above-mentioned ratio, rupture tends to be caused easily at the time of heat fixation. The upper limit of the relaxation ratio in the TD is preferably 10% and if it exceeds the above-mentioned ratio, sagging may occur and it may result in thickness unevenness.

The lower limit of the thickness of the biaxially stretched polyester film of the present invention is preferably 3 μm, more preferably 5 μm, and still more preferably 8 μm. If the thickness is less than 3 μm, the strength as a film becomes insufficient in some cases. The upper limit of the film thickness is preferably 100 μm, more preferably 75 μm, and still more preferably 50 μm. If it exceeds 100 the thickness becomes too thick to make processing relevant to the aim of the present invention difficult in some cases.

The lower limit of the plane orientation coefficient of the biaxially stretched polyester film of the present invention is preferably 0.1 and if it is less than 0.1, piercing strength, impact strength, etc. may be lowered in some cases. The upper limit of the plane orientation coefficient is preferably 0.15 and if it exceeds 0.15, productivity is lowered and additionally, flexibility or the like may be lowered in some cases. The plane orientation coefficient can be adjusted to be within the above-mentioned range by adjusting the MD stretch ratio and the heat fixation temperature. As a stretching method, sequential stretching is more preferable than simultaneous stretching, and particularly sequential stretching by stretching in the MD direction and thereafter stretching in the TD direction is furthermore preferable.

The biaxially stretched polyester film of the present invention is preferable to have the same resin composition in the entire thickness direction of the film.

Another layer of another material may be layered on the biaxially stretched polyester film of the present invention, and an example of a method for layering may be lamination after or during formation of the biaxially stretched polyester film of the present invention.

(Physical Properties of Film)

In the biaxially stretched polyester film of the present invention, yield stress in the MD is preferably not more than 70 MPa, more preferably not more than 65 MPa, and still more preferably not more than 60 MPa. If it is less than the above-mentioned value, the film becomes difficult to be expanded and it may result in inferiority in terms of processability such as drawing processing after lamination with various kinds of sealants.

In the biaxially stretched polyester film of the present invention, yield stress in the TD is preferably not more than 70 MPa, more preferably not more than 65 MPa, and still more preferably not more than 60 MPa. If it is less than the above-mentioned value, the film becomes difficult to be expanded and it may result in inferiority in terms of processability such as drawing processing after lamination with various kinds of sealants.

In the biaxially stretched polyester film of the present invention, the lower limit of the rupture strength in the MD is preferably 160 MPa, more preferably 180 MPa, and still more preferably 200 MPa. If it is less than the above-mentioned value, the film becomes easy to be ruptured at the time of processing or drawing formation after lamination with various kinds of sealants and additionally, a bag is easy to be torn when a bag is dropped.

The upper limit of the rupture strength in the MD is preferably 300 MPa. If it exceeds the above-mentioned value, the effect of improving the rupture strength may be saturated in some cases.

In the biaxially stretched polyester film of the present invention, the lower limit of the rupture strength in the TD is preferably 160 MPa, more preferably 180 MPa, and still more preferably 200 MPa. If it is less than the above-mentioned value, the film becomes easy to be ruptured at the time of processing or drawing formation after lamination with various kinds of sealants and additionally, a bag is easy to be torn when a bag is dropped. The rupture elongation in the MD can be adjusted to be within the above-mentioned range based on the stretch ratio in the MD and the heat fixation temperature.

The upper limit of the rupture strength in the TD is preferably 300. If it exceeds the above-mentioned value, the effect of improving the rupture strength may be saturated in some cases.

In the biaxially stretched polyester film of the present invention, the lower limit of the ratio of the rupture strength in the MD and the rupture strength in the TD is preferably 0.5, more preferably 0.7, and still more preferably 0.9. If it is less than the above-mentioned value, the vertical and transverse deformation at the time of drawing formation may be put out of balance and the thickness of a formed product may be uneven in some cases. The rupture elongation in the TD can be adjusted to be within the above-mentioned range based on the stretch ratio in the MD and the heat fixation temperature.

The upper limit of the ratio of rupture strength in the MD and rupture strength in the TD is preferably 1.5, more preferably 1.3, and still more preferably 1.1. If it exceeds the above-mentioned value, the vertical and transverse deformation at the time of drawing formation may be put out of balance and the thickness of a formed product may be uneven in some cases.

In the biaxially stretched polyester film of the present invention, the lower limit of the rupture elongation in the MD on the basis of % is preferably 100%, more preferably 110%, and still more preferably 120%. If it is less than the above-mentioned value, it may result in inferiority in terms of processability such as drawing processing after lamination with various kinds of sealants in some cases.

The upper limit of the rupture elongation in the MD is preferably 200% and if it is exceeds 200%, the effect of improvement may be saturated in some cases.

The lower limit of the rupture elongation in the TD is preferably 100%, more preferably 110%, and still more preferably 120%. If it is less than the above-mentioned value, it may result in inferiority in terms of processability such as drawing processing after lamination with various kinds of sealants in some cases.

The upper limit of the rupture elongation in the TD is preferably 200% and if it is exceeds 200%, the effect of improvement may be saturated in some cases.

In the biaxially stretched polyester film of the present invention, the lower limit of the ratio of the rupture elongation in the MD and the rupture elongation in the TD is preferably 0.5, more preferably 0.7, and still more preferably 0.9. If it is less than the above-mentioned value, the vertical and transverse deformation at the time of drawing formation may be put out of balance and even formation may become impossible and rupture and pinholes may be caused in some cases.

The upper limit of the ratio of the rupture elongation in the MD and the rupture elongation in the TD is preferably 1.5, more preferably 1.3, and still more preferably 1.1. If it exceeds the above-mentioned value, the vertical and transverse deformation at the time of drawing formation may be put out of balance and even formation may become impossible and rupture and pinholes may be caused in some cases.

To obtain a biaxially stretched polyester film having yield stress, rupture strength, and rupture elongation in the above-mentioned ranges, there is a method preferred for layering the same resin composition in multi-layers.

In the case where a laminated body obtained by laminating the biaxially stretched polyester film of the present invention and an aluminum foil is formed by drawing, the lower limit of the drawing depth to which formation can be carried out evenly without rupture is preferably not less than 5 mm, more preferably not less than 5.5 mm, and still more preferably not less than 6 mm.

If the drawing formability exceeds 5 mm, the product is regarded to be suitable for drawing formation for an external material of batteries.

The lower limit of the piercing strength of the biaxially stretched polyester film of the present invention is preferably 0.8 N/μm and more preferably 0.9 N/μm. If it is less than 0.8 N/μm, the strength becomes insufficient in some cases at the time of processing or producing a bag. The upper limit of the piercing strength is preferably 1.5 N/μm and if it is exceeds 1.5 N/μm, the effect of improvement may be saturated in some cases. The piercing strength can be adjusted to be within the above-mentioned range based on the stretch ratio in the MD and the heat fixation temperature.

The lower limit of the impact strength (impact resistance) of the biaxially stretched polyester film of the present invention is preferably 0.075 J/μm and more preferably 0.08 J/μm. If it is less than 0.075 J/μm, the strength may become insufficient in some cases when the film is used as a bag. The upper limit of the impact strength (impact resistance) is preferably 0.2 J/μm and if it exceeds 0.2 J/μm, the effect of improvement may be saturated in some cases.

The biaxially stretched polyester film of the present invention is more suitable for uses as a wrapping material and an external material if having the following film properties.

In the biaxially stretched polyester film of the present invention, the lower limit of the elastic modulus in the MD is preferably 1 GPa, more preferably 1.2 GPa, and still more preferably 1.4 GPa. If it is less than the above-mentioned value, the film is easy to be expanded and pitches may become different at the time of processing such as printing or lamination.

The upper limit of elastic modulus in the MD is preferably 3 GPa, more preferably 2.8 GPa, and still more preferably 2.6 GPa. If it exceeds the above-mentioned value, it may result in inferiority in terms of processability such as drawing processing after lamination with various kinds of sealants in some cases.

In the biaxially stretched polyester film of the present invention, the lower limit of the elastic modulus in the TD is preferably 1 GPa, more preferably 1.2 GPa, and still more preferably 1.4 GPa. If it is less than the above-mentioned value, a problem may be caused in some cases at the time of processing.

The upper limit of elastic modulus in the TD is preferably 3 GPa, more preferably 2.8 GPa, and still more preferably 2.6 GPa. If it exceeds the above-mentioned value, it may result in inferiority in terms of processability such as drawing processing after lamination with various kinds of sealants in some cases.

The lower limit of ratio of moisture absorption of the biaxially stretched polyester film of the present invention is preferably 0.1% and if it is less than the above-mentioned value, the effect of improvement may be saturated. The upper limit of coefficient of moisture absorption is preferably 1% and if it exceeds the above-mentioned value, dimensional change due to moisture absorption tend to be caused in some cases.

In the biaxially stretched polyester film of the present invention, the lower limit of thermal shrinkage of the film in the MD is preferably 0.1% and if it is less than the above-mentioned value, the effect of improvement may be saturated and additionally, the film may become mechanically fragile in some cases. The upper limit of thermal shrinkage in the MD is preferably 4% and if it exceeds the above-mentioned value, pitch difference may be caused owing to the dimensional change at the time of processing such as printing.

In the biaxially stretched polyester film of the present invention, the lower limit of thermal shrinkage of the film in the TD is preferably 0.1% and if it is less than the above-mentioned value, the effect of improvement may be saturated and additionally, the film may become mechanically fragile in some cases. The upper limit of thermal shrinkage in the TD is preferably 3% and if it exceeds the above-mentioned value, shrinkage in the width direction may be caused owing to the dimensional change at the time of processing such as printing.

In the biaxially stretched polyester film of the present invention, haze is preferably not more than 20%, more preferably not more than 18%, still more preferably not more than 15%, and even more preferably not more than 10%. If it is less than the above-mentioned value, transparency may be worsened and the appearance grade of a formed product may be lowered in some cases.

The lower limit of the number of generated pinholes in the biaxially stretched polyester film of the present invention measured by a Gelbo flex tester is preferably 0 (after 2000 times CPP lamination). The upper limit of the number measured by the Gelbo flex tester is preferably by 10 (after 2000 times CPP lamination) and more preferably by 5 (after 1000 times CPP lamination). If a film having more than 10 pinholes (after 2000 times CPP lamination) is used in form of a bag, holes tend to be formed easily.

The biaxially stretched polyester film of the present invention has low moisture absorption property and therefore is scarcely strained and excellent in smell retaining property.

EXAMPLES

Next, the present invention will be described in more detail with reference to Examples, but the present invention should not be limited to these Examples. Film evaluation was carried out by the following measurement methods.

[Film Formability]

Film formability of a biaxially stretched film was evaluated according to the following standard. If marked with ○ and Δ, it was determined that productivity was good.

○: A film was formed without rupture and continuous production was possible.

Δ: Film formability was more or less unstable and rupture rarely occurred but continuous production was possible.

x: Rupture often occurred and continuous production was difficult.

[Mechanical Characteristics (Yield Stress Value, Initial Elastic Modulus, Rupture Strength, Rupture Elongation)]

Methods were carried out according to JIS K 7113. Each specimen was obtained by cutting each film in dimensional size of 10 mm width and 100 mm length in the longitudinal direction and in the width direction with a razor. Each specimen was left to stand in environments of 23° C. and 65% RH for 12 hours and thereafter, measurement was carried out in environments of 23° C. and 65% RH at pulling speed of 200 mm/min with chuck distance of 100 mm and the average value of 5 measurements was employed. Autograph AG 5000 A manufactured by Shimadzu Corporation was employed.

[Spherulite Size]

Each un-stretched sheet obtained by casting was sampled and Hv light scattering pattern of each un-stretched sheet was measured by using a light scattering measurement apparatus (Dyna-3000, manufactured by OTSUKA ELECTRONICS Co., LTD.) Using the HV light scattering pattern obtained when the measurement center angle was changed to be 0°, 20°, and 60°, the spherulite radius was measured based on the spread of the scattering pattern. The unit was [nm].

[Thickness]

The thickness was measured by a method according to JIS-Z-1702.

[Plane Orientation Coefficient]

Ten specimens were sampled from each rolled sample in the width direction. According to JIS K 7142-1996 5.1 (A method), refractive index in the longitudinal direction (nx), refractive index in the width direction (ny), and refractive index in the thickness direction (nz) were measured for each specimen by using sodium D-ray as a light source and Abbe's refractometer and the plane orientation coefficient (ΔP) was calculated according to the following expression. The average value of the measured plane orientation coefficients was employed as the plane orientation coefficient.

$$\Delta P=(nx+ny)/2-nz$$

The difference of plane orientation coefficient in the width direction was the difference between the maximum value and the minimum value of the above-mentioned ten specimens.

[Drawing Formability]

Each obtained film roll and an aluminum foil (8079 material, thickness of 40 μm) were dry-laminated using a urethane type adhesive (TM-509, CAT10L, ethyl acetate at 33.6:4.0:62.4 (mass ratio), manufactured by Toyo-Morton, Ltd.) to produce a film/aluminum foil laminated body. The obtained laminated body was set in a die set mold (90 mm×50 mm projection shape) in such a manner that the polyester film was in the outer side and pressurized at 23° C. by a pressing machine to carry out drawing formation. The drawing depth at the time of the formation was increased every 0.2 mm and the maximum depth to the extent that the laminated body was not broken was determined to the drawing depth.

[Piercing Strength]

Measurement was carried out according to "2. Tensile Strength-Testing Method" defined by "Third: Instruments and Container Wrapping, Standards for Food and Additives" (the Ministry of Health and Welfare, Notice 20 in 1982) in Food Sanitation Act. Each film was pierced by a needle with the tip end diameter of 0.7 mm at piercing speed of 50 mm/min and the strength at the time of piercing the film with the needle was measured to give the piercing strength. The measurement was carried out at normal temperature (23° C.) and the unit was [N/μm].

[Impact Strength]

The strength of each film in environments at 23° C. against impact punching was measured by using an impact tester manufactured by TOYO SEIKI SEISAKU-SHO, LTD. The tester employed had impact sphere with diameter of ½ inch. The unit was [J/μm].

[Thermal Shrinkage]

The thermal shrinkage of each polyester film was measured by a dimensional change testing method described in JIS-C-2318, except that the testing temperature was at 150° C. and the heating time was 15 minutes. The thermal shrinkage of each nylon film was measured by a dimensional change testing method described in JIS-C-2318, except that the testing temperature was at 160° C. and the heating time was 10 minutes. The unit was [%].

[Haze]

Haze was measured at 3 different points by a method according to JIS-K-7105 using a haze meter (NDH 2000, manufactured by NIPPON DENSHOKU INDUSTRIES Co., LTD.) and the average value was defined as haze.

The unit was [%].

[Pinhole Resistance]

Each film according to the present invention was cut in a size of 20.3 cm (8 inch)×27.9 cm (11 inch) and the obtained rectangular test film after the cutting was left to stand in the condition of 23° C. and 50% RH for 24 hours and thus conditioned. Thereafter, each rectangular test film was rolled into a cylindrical form with a length of 20.32 cm (8 inch). One end of the cylindrical film was fixed in the outer circumference of a disk-like fixed head of a Gelbo flex tester (NO. 901 Model, manufactured by Rigaku Corporation) (according to the standard of MIL-B-131C) and the other end of the cylindrical film was fixed in the outer circumference of a disk-like movable head set on the opposite to the fixed head at 17.8 cm (7 inch) interval. A bending test was performed by continuously repeating 2000 cycles at 40 cycles/min, each of which was carried out by rotating the movable head at 440° while moving the movable head closer to the fixed bed by 7.6 cm (3.5 inch) along the axis between both heads set on the opposite to each other in parallel, successively moving the movable head forward by 6.4 cm (2.5 inch) without rotating the movable head, executing these movements reversely to turn the movable head back to the initial position. The test was performed at 5° C. Thereafter, the number of pinholes generated in the portion of the tested film of 17.8 cm (7 inch)×27.9 cm (11 inch) excluding the parts fixed in the outer circumferences of the fixed head and the movable head was measured (that is, the number of pinholes generated in 497 cm$^2$ (77 square inch).

Example 1

PBT (NOVADURAN 5020, melting point 220° C., manufactured by Mitsubishi Engineering-Plastics Corporation) as a polyester resin composition (A) was mixed with a master batch containing calcium carbonate as a lubricant in a lubricant concentration of 2000 ppm by using a single screw extruder and melted at 270° C. and the obtained melt line was introduced into a static mixer having 12 elements. Accordingly, the PBT melt body was separated and layered to obtain a multi-layer melt body made of a single raw material. The melt body was cast by a T-die at 270° C. and closely stuck to a chill roll at 10° C. by electrostatic adhesion method to obtain an un-stretched sheet. The surface temperature of the chill roll was measured at every 10 cm interval in the width direction (by a thermocouple) to find a distribution of not more than 3° C. Successively, 3.2 times roll stretching was carried out at 60° C. in the vertical direction and thereafter, 3.9 times stretching was carried out at 80° C. in the transverse direction by leading the obtained sheet to a tenter and then the sheet was subject to the heat tension treatment at 200° C. for 3 seconds and to relaxation treatment by 3% for 1 second and both end parts were cut to give a PBT film with thickness of 12 μm.

The film formation conditions, physical properties, and evaluation results of the obtained films are shown in Table 1.

Examples 2 to 9

The same process as that in Example 1 was carried out except that the raw material composition and the film formation conditions were changed as described in biaxially stretched films of Table 1 in Example 1. (PBT: NOVADURAN 5020, manufactured by Mitsubishi Engineering-Plastics Corporation, melting point 220° C.) (ecoflex: polybutylene adipate-butylene terephthalate copolymer, manufactured by BASF)

(GS 390, copolymerization components: polybutylene terephthalate, polycarbonate, manufactured by TOYOBO CO., LTD.)

The film formation conditions, physical properties, and evaluation results of the obtained films are shown in Table 1.

Comparative Examples 1 to 4

The same process as that in Example 1 was carried out except that the raw material composition and the film formation conditions were changed as described in biaxially stretched films of Table 2 in Example 1. (PBT: NOVADURAN 5020, manufactured by Mitsubishi Engineering-Plastics Corporation, melting point 220° C.) (ecoflex: polybutylene adipate-butylene terephthalate copolymer, manufactured by BASF)

The film formation conditions, physical properties, and evaluation results of the obtained films are shown in Table 2.

Comparative Example 5

PBT (NOVADURAN 5020, melting point 220° C., manufactured by Mitsubishi Engineering-Plastics Corporation) as a polyester resin and polyethylene terephtalate (intrinsic viscosity of 0.65) were used and the PBT and PET were melted respectively at 280° C. by using extruders and joined by a 1201 layered feed block to obtain a PBT/PET alternately multi-layered melt body. The alternately layered body was cast by a die at 280° C. and closely stuck to a chill roll at 20° C. by electrostatic adhesion method to obtain an un-stretched sheet. The obtained un-stretched film was biaxially stretched in the film formation condition shown in Table 2 to obtain a PBT/PET alternately layered biaxially stretched film.

The physical properties and evaluation results of the obtained films are shown in Table 2.

Comparative Example 6

PBT (NOVADURAN 5020, melting point 220° C., manufactured by Mitsubishi Engineering-Plastics Corporation) as a polyester resin was used, melted at 280° C. by using a single screw extruder, cast by a die at 270° C., and closely stuck to a chill roll at 15° C. by an electrostatic adhesion method to obtain an un-stretched sheet. Film formation was carried out while adjusting the rolling speed to give the thickness of 20 µm.

The physical properties and evaluation results of the obtained films are shown in Table 2.

Comparative Example 7

A PBT film manufactured by Kansaikagakukogyo Co., Ltd. and commercialized as a representative inflation biaxially stretched PBT film was used.

The physical properties and evaluation results of the obtained films are shown in Table 2.

Comparative Example 8

An ester film E5100-12 µm manufactured by TOYOBO CO., LTD. was used.

The physical properties and evaluation results of the obtained films are shown in Table 2.

Comparative Example 9

A nylon film N1100-15 µm manufactured by TOYOBO CO., LTD. was used.

The physical properties and evaluation results of the obtained films are shown in Table 2.

TABLE 1

| | item | | unit | Example 1 | 2 | 3 | 4 | 5 | 6 | 7 | 8 | 9 |
|---|---|---|---|---|---|---|---|---|---|---|---|---|
| raw material | A | name | — | PBT | PBT | PBT | PBT | PBT | PBT | PBT | PBT | PBT |
| | | rate | wt. % | 100 | 100 | 100 | 90 | 80 | 60 | 60 | 90 | 90 |
| | B-1 | name | — | — | — | — | ecoflex | GS390 | GS390 | ecoflex | ecoflex | ecoflex |
| | | rate | wt. % | — | — | — | 10 | 20 | 40 | 10 | 10 | 10 |
| | B-2 | name | — | — | — | — | — | — | — | PET | — | — |
| | | rate | wt. % | — | — | — | — | — | — | 30 | — | — |
| film formation condition | temperature of extruder | | ° C. | 270 | 270 | 270 | 270 | 270 | 270 | 280 | 270 | 270 |
| | ultra multi-layer or not | | — | Yes | Yes | Yes | Yes | Yes | Yes | Yes | Yes | Yes |
| | the number of the elements | | pieces | 12 | 12 | 12 | 12 | 12 | 12 | 12 | 6 | 12 |
| | the number of the layers | | layers | 4096 | 4096 | 4096 | 4096 | 4096 | 4096 | 4096 | 64 | 4096 |
| | chill roll temperature | | ° C. | 10 | 10 | 10 | 15 | 15 | 16 | 19 | 15 | 23 |
| | spherulite size | | nm | 300 | 300 | 300 | 300 | 300 | 300 | 300 | 450 | 300 |
| | gravity of the center part | | g/cm³ | 1.285 | 1.288 | 1.285 | 1.296 | 1.290 | 1.292 | 1.294 | 1.298 | 1.305 |
| | stretching temperature in the MD | | ° C. | 60 | 60 | 60 | 60 | 60 | 60 | 60 | 60 | 60 |
| | stretch ratio in the MD | | times | 3.2 | 4 | 3.5 | 3.5 | 3.5 | 3.5 | 3.5 | 3.5 | 3.5 |
| | stretching temperature in the TD | | ° C. | 70 | 70 | 70 | 70 | 70 | 80 | 80 | 70 | 70 |
| | stretch ratio in the TD | | times | 3.9 | 3.9 | 3.9 | 4.0 | 4.1 | 4.1 | 4.2 | 4.0 | 4.0 |
| | heat fixation temperature | | ° C. | 200 | 200 | 200 | 200 | 205 | 205 | 200 | 200 | 200 |
| | relaxation ratio | | % | 5 | 5 | 5 | 5 | 5 | 5 | 5 | 5 | 5 |
| | film formability | | — | ○ | ○ | ○ | ○ | ○ | ○ | ○ | ○ | ○ |
| properties | thickness, µm | | µm | 12 | 12 | 12 | 12 | 20 | 12 | 20 | 12 | 12 |
| | yield stress in the MD | | MPa | 66 | 67 | 66 | 52 | 55 | 53 | 65 | 54 | 55 |
| | yield stress in the TD | | MPa | 64 | 65 | 65 | 51 | 53 | 52 | 62 | 53 | 54 |
| | rupture strength | MD | MPa | 170 | 261 | 220 | 250 | 225 | 236 | 230 | 223 | 222 |
| | | TD | MPa | 168 | 171 | 210 | 242 | 230 | 228 | 240 | 212 | 213 |
| | | MD/TD | — | 1.01 | 1.53 | 1.05 | 1.03 | 0.98 | 1.04 | 0.96 | 1.05 | 1.04 |
| | rupture elongation | MD | % | 178 | 131 | 132 | 179 | 141 | 151 | 115 | 130 | 143 |
| | | TD | % | 117 | 122 | 123 | 144 | 121 | 139 | 105 | 102 | 124 |
| | | MD/TD | — | 1.52 | 1.07 | 1.07 | 1.24 | 1.17 | 1.09 | 1.10 | 1.27 | 1.15 |

TABLE 1-continued

| item | unit | Example 1 | 2 | 3 | 4 | 5 | 6 | 7 | 8 | 9 |
|---|---|---|---|---|---|---|---|---|---|---|
| elastic modulus in the MD | GPa | 2.55 | 2.50 | 2.43 | 2.55 | 2.65 | 2.49 | 2.53 | 2.33 | 2.63 |
| elastic modulus in the TD | GPa | 2.40 | 2.50 | 2.32 | 2.34 | 2.54 | 2.39 | 3.33 | 2.51 | 2.57 |
| plane orientation coefficient | — | 0.14 | 0.14 | 0.14 | 0.14 | 0.14 | 0.14 | 0.12 | 0.14 | 0.14 |
| drawing formability | mm | 5.2 | 5.4 | 6.2 | 6.6 | 6.4 | 6.6 | 5.4 | 6.4 | 6.2 |
| piercing strength | N/μm | 0.975 | 1.075 | 1.083 | 1.250 | 1.005 | 1.230 | 0.900 | 0.850 | 1.005 |
| impact strength | J/μm | 0.080 | 0.088 | 0.095 | 0.101 | 0.097 | 0.092 | 0.075 | 0.092 | 0.095 |
| moisture absorption | % | 0.1 | 0.1 | 0.1 | 0.1 | 0.1 | 0.1 | 0.1 | 0.1 | 0.1 |
| thermal shrinkage of the film in the MD | % | 2.80 | 2.70 | 2.49 | 2.30 | 2.43 | 2.62 | 1.73 | 2.95 | 2.31 |
| thermal shrinkage of the film in the TD | % | 2.50 | 2.60 | 2.45 | 2.27 | 2.55 | 2.30 | 1.37 | 2.80 | 2.48 |
| haze | % | 4.5 | 5.0 | 5.5 | 15.0 | 10.7 | 9.6 | 13.0 | 15.0 | 17.0 |
| Gelbo flex test | pieces | 3 | 3 | 4 | 0 | 1 | 0 | 5 | 1 | 1 |

TABLE 2

| | item | | unit | Comparative Example 1 | 2 | 3 | 4 | 5 | 6 | 7 | 8 | 9 |
|---|---|---|---|---|---|---|---|---|---|---|---|---|
| raw material | A | name | — | PBT | PBT | PBT | PBT | PBT | PBT | PBT | PET ES100 manufactured by TOYOBO CO., LTD. | Ny N1100 manufactured by TOYOBO CO., LTD. |
| | | rate | wt. % | 100 | 90 | 50 | 100 | 50 | 100 | 100 | | |
| | B-1 | name | — | — | ecoflex | PET | — | PET | — | — | | |
| | | rate | wt. % | — | 10 | 50 | — | 50 | — | — | | |
| | B-2 | name | — | — | — | — | — | — | — | — | | |
| | | rate | wt. % | — | — | — | — | — | — | — | | |
| film formation condition | temperature of extruder | | ° C. | 270 | 270 | 285 | 285 | 280 | 270 | film formation by an inflation biaxial stretching | | |
| | ultra multi-layer or not | | — | No | No | No | Yes | Yes | No | | | |
| | the number of the elements | | pieces | — | — | — | 12 | feed block | — | | | |
| | the number of the layers | | layers | single layer | single layer | single layer | 4096 | 1201 (A/B alternately laminated) | — | | | |
| | chill roll temperature | | ° C. | 22 | 15 | 20 | 20 | 20 | 15 | | | |
| | spherulite size | | nm | 600 | 600 | 600 | — | — | — | | | |
| | gravity of the center part | | g/cm³ | 1.32 | 1.298 | 1.308 | 1.355 | 1.308 | 1.28 | | | |
| | stretching temperature in the MD | | ° C. | 60 | 60 | 70 | 80 | 60 | No | | | |
| | stretch ratio in the MD | | times | 3.5 | 3.5 | 3.5 | 3.1 | 3.3 | | | | |
| | stretching temperature in the TD | | ° C. | 70 | 70 | 85 | 90 | 90 | | | | |
| | stretch ratio in the TD | | times | 4 | 4 | 4 | 3.9 | 4 | | | | |
| | heat fixation temperature | | ° C. | 200 | 200 | 200 | 210 | 235 | | | | |
| | relaxation ratio | | % | 5 | 5 | 5 | 5 | 5 | | | | |
| | film formability | | — | X | X | ○ | ○ | ○ | | | | |
| properties | thickness, μm | | μm | 12 | | | 12 | 15 | 20 | 15 | 12 | 15 |
| | yield stress in the MD | | MPa | 75 | | | 116 | 84 | 62 | 71 | 117 | 52 |
| | yield stress in the TD | | MPa | 73 | | | 111 | 85 | 62 | 69 | 113 | 50 |
| | rupture strength | MD | MPa | 200 | | | 228 | 165 | 60 | 210 | 230 | 206 |
| | | TD | MPa | 250 | | | 236 | 159 | 60 | 230 | 240 | 290 |
| | | MD/TD | — | 0.80 | | | 0.97 | 1.04 | 1.00 | 0.91 | 0.96 | 0.71 |
| | rupture elongation | MD | % | 124 | | | 102 | 229 | 500 | 135 | 100 | 105 |
| | | TD | % | 91 | | | 95 | 225 | 600 | 90 | 90 | 65 |
| | | MD/TD | — | 1.36 | | | 1.07 | 1.02 | 0.83 | 1.50 | 1.11 | 1.62 |
| | elastic modulus in the MD | | GPa | 2.53 | | | 3.7 | 3.5 | 1.5 | 2.26 | 3.9 | 1.5 |
| | elastic modulus in the TD | | GPa | 2.51 | | | 3.9 | 4.8 | 1.5 | 1.76 | 4 | 1.0 |
| | plane orientation coefficient | | — | 0.13 | | | 0.16 | 0.13 | 0 | 0.08 | 0.16 | 0.06 |
| | drawing formability | | mm | 4.5 | | | 4.2 | 4.4 | 6.8 | 4.6 | 4.0 | 7.0 |
| | piercing strength | | N/μm | 0.750 | | | 1.005 | 0.830 | 0.200 | 0.720 | 1.000 | 0.933 |
| | impact strength | | J/μm | 0.067 | | | 0.043 | 0.050 | 0.060 | 0.055 | 0.042 | 0.073 |

TABLE 2-continued

| item | unit | Comparative Example ||||||||| 
| | | 1 | 2 | 3 | 4 | 5 | 6 | 7 | 8 | 9 |
|---|---|---|---|---|---|---|---|---|---|---|
| moisture absorption | % | 0.1 | | | 0.1 | 0.1 | 0.1 | 0.2 | 0.1 | 1.5 |
| thermal shrinkage of the film in the MD | % | 2.50 | | | 1.50 | 2.30 | 0.00 | 0.70 | 1.40 | 1.01 |
| thermal shrinkage of the film in the TD | % | 2.30 | | | 0.30 | 1.90 | 0.00 | −0.60 | 0.20 | 1.00 |
| haze | % | 15.0 | | | 2.6 | 12.0 | 18.0 | 12.0 | 2.3 | 1.3 |
| Gelbo flex test | pieces | 5 | | | 30 | 10 | 13 | 5 | 30 | 0 |

INDUSTRIAL APPLICABILITY

The present invention makes it possible to obtain a biaxially stretched polyester film suitable for uses for which nylon films and other flexible films have conventionally been used and suitable for uses such as wrapping materials for retort food and external materials for lithium ion batteries for which drawing formation is carried out.

The invention claimed is:

1. A biaxially stretched polyester film made of a polyester composition (A) containing not less than 60 mass % of a polybutylene terephthalate; wherein the biaxially stretched polyester film has a yield stress in a MD of not more than 70 MPa, yield stress in a TD of not more than 70 MPa, rupture strength in the MD of 160 MPa to 300 MPa, rupture strength in the TD of 160 MPa to 300 MPa, and rupture elongation in the MD and TD of 100% to 200%.

2. The biaxially stretched polyester film according to claim 1, wherein the polyester resin (A) contains a polyester resin (B) other than polybutylene terephthalate.

3. A method for producing the biaxially stretched polyester film according to claim 2, wherein the biaxially stretched polyester film is obtained by biaxially stretching an un-stretched polyester sheet with a thickness of 15 to 2500 µm which is obtained by multi-layering a same composition in not less than 60 layers and casting the layered body.

4. A method for producing the biaxially stretched polyester film according to claim 2, obtained by bringing an un-stretched polyester sheet into contact with a chill roll at not more than 20° C. to cool the sheet and biaxially stretching the sheet.

5. A method for producing the biaxially stretched polyester film according to claim 2, wherein the biaxially stretched polyester film is obtained by biaxially stretching an un-stretched polyester sheet containing spherulites with diameter of not more than 500 nm in the un-stretched polyester sheet.

6. The biaxially stretched polyester film according to claim 2, having a ratio of the rupture strength in the MD and the rupture strength in the TD of not more than 1.5 and a ratio of the rupture elongation in the MD and the rupture elongation in the TD of not more than 1.5.

7. A method for producing the biaxially stretched polyester film according to claim 4, wherein the biaxially stretched polyester film is obtained by sequentially biaxially stretching the un-stretched polyester sheet.

8. A method for producing the biaxially stretched polyester film according to claim 5, wherein the biaxially stretched polyester film is obtained by sequentially biaxially stretching the un-stretched polyester sheet.

9. A method for producing the biaxially stretched polyester film according to claim 1, wherein the biaxially stretched polyester film is obtained by biaxially stretching an un-stretched polyester sheet with a thickness of 15 to 2500 µm which is obtained by multi-layering a same composition in not less than 60 layers and casting the layered body.

10. A method for producing the biaxially stretched polyester film according to claim 1, obtained by bringing an un-stretched polyester sheet into contact with a chill roll at not more than 20° C. to cool the sheet and biaxially stretching the sheet.

11. A method for producing the biaxially stretched polyester film according to claim 10, wherein the biaxially stretched polyester film is obtained by sequentially biaxially stretching the un-stretched polyester sheet.

12. A method for producing the biaxially stretched polyester film according to claim 1, wherein the biaxially stretched polyester film is obtained by biaxially stretching an un-stretched polyester sheet containing spherulites with diameter of not more than 500 nm in the un-stretched polyester sheet.

13. A method for producing the biaxially stretched polyester film according to claim 12, wherein the biaxially stretched polyester film is obtained by sequentially biaxially stretching the un-stretched polyester sheet.

14. The biaxially stretched polyester film according to claim 1, having a ratio of the rupture strength in the MD and the rupture strength in the TD of not more than 1.5 and a ratio of the rupture elongation in the MD and the rupture elongation in the TD of not more than 1.5.

* * * * *